(12) United States Patent
Balogh et al.

(10) Patent No.: US 11,408,989 B2
(45) Date of Patent: Aug. 9, 2022

(54) APPARATUS AND METHOD FOR DETERMINING A SPEED OF A VEHICLE

(71) Applicant: KNORR-BREMSE SYSTEME FUER NUTZFAHRZEUGE GMBH, Munich (DE)

(72) Inventors: Levente Balogh, Szigetszentmiklos (HU); Csaba Doczy, Budapest (HU); Kornel Straub, Pomaz (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 612 days.

(21) Appl. No.: 16/342,835

(22) PCT Filed: Oct. 19, 2017

(86) PCT No.: PCT/EP2017/076766
§ 371 (c)(1),
(2) Date: Apr. 17, 2019

(87) PCT Pub. No.: WO2018/077724
PCT Pub. Date: May 3, 2018

(65) Prior Publication Data
US 2019/0257936 A1 Aug. 22, 2019

(30) Foreign Application Priority Data
Oct. 25, 2016 (EP) .................................. 16195469

(51) Int. Cl.
*G01S 13/60* (2006.01)
*G01S 13/931* (2020.01)
*G01S 17/58* (2006.01)

(52) U.S. Cl.
CPC ............ *G01S 13/60* (2013.01); *G01S 13/931* (2013.01); *G01S 17/58* (2013.01);
(Continued)

(58) Field of Classification Search
CPC .... B60T 2250/04; G01S 13/60; G01S 13/931; G01S 17/58; G01S 2013/93185; G01S 2013/9323
See application file for complete search history.

(56) References Cited

U.S. PATENT DOCUMENTS

2013/0124061 A1* 5/2013 Khanafer ................ G01S 7/352
701/1
2014/0136097 A1* 5/2014 Tsuchida ............. B60W 30/095
701/301
(Continued)

FOREIGN PATENT DOCUMENTS

| DE | 2365414 A1 | 1/1975 |
| DE | 102009053817 B4 | 7/2011 |
| EP | 1014108 A1 | 6/2000 |

OTHER PUBLICATIONS

International Search Report dated Jan. 19, 2018, of the corresponding International Application PCT/EP2017/076766 filed Oct. 19, 2017.

*Primary Examiner* — Timothy X Pham
(74) *Attorney, Agent, or Firm* — Norton Rose Fulbright US LLP; Gerard Messina

(57) ABSTRACT

An apparatus for determining a speed of a vehicle, in which the vehicle includes one or more sensors to determine a distance to or a relative speed of an object in an environment of the vehicle, and in which the apparatus includes a data interface and a processing module. The data interface is configured to receive sensor data from the one or more sensors, where the sensor data indicates the distance to and/or the relative speed of the object. The processing module is configured to determine (i) a motion state of the object based on the received sensor data, and (ii) the speed of the vehicle based on the determined motion state and the received sensor data.

16 Claims, 3 Drawing Sheets

(52) U.S. Cl.
CPC ... *B60T 2250/04* (2013.01); *G01S 2013/9323* (2020.01); *G01S 2013/93185* (2020.01)

(56) References Cited

U.S. PATENT DOCUMENTS

| | | | |
|---|---|---|---|
| 2014/0368493 A1 | 12/2014 | Rogan et al. | |
| 2015/0005993 A1 | 1/2015 | Breuing | |
| 2018/0211536 A1* | 7/2018 | Akamine | G01S 13/723 |
| 2018/0286247 A1* | 10/2018 | Fujita | B60W 10/04 |
| 2018/0372860 A1* | 12/2018 | Baba | G01S 13/867 |
| 2019/0143925 A1* | 5/2019 | Akamine | B60R 21/00 342/70 |

* cited by examiner

APPARATUS AND METHOD FOR DETERMINING A SPEED OF A VEHICLE

FIELD OF THE INVENTION

The present invention relates to an apparatus and a method for determining a speed of a vehicle and, in particular, to a vehicle speed evaluation based on environment object references.

BACKGROUND INFORMATION

Electronic braking systems of vehicles may be equipped with wheel speed sensors to control a brake force dependent on a wheel slip to ensure a desired wheel slip during braking operation. Such electronic systems are used for the service brake as well as the electronic parking brake. An optimal wheel slip ensures an efficient braking performance while maintaining the stability of the vehicle. The performance of such systems depends, however, on the capability to evaluate correctly the speed of the vehicle. However, the slip can often not correctly be determined precisely based on wheel speeds only. To improve the accuracy of the vehicle speed determination a global positioning system (GPS) or additional speed meters may be used.

For example, DE 10 2009 053 817 B4 discusses a slip control brake system which uses GPS signals for a vehicle speed estimation. Likewise, DE 2 365 414 discusses a system that uses a radar unit directed on the road to evaluate the vehicle speed. Other known systems use further speed sensors on various axles in connection with the wheels to determine both the wheel speed and the vehicle speed. Although taking into account additional GPS signals improves the situation, a precise positioning is very difficult and often not possible with the conventional technique. Moreover, unstable satellite connections may reduce the availability significantly and thus compromises the reliability of these systems.

Further systems are based on a fifth wheel, Doppler sensors or other specifically dedicated sensors. However, the further additional components make these systems more complex and generate additional costs.

Therefore, there is a demand for a simple system to determine a speed of the vehicle independently of rotational speed sensors.

SUMMARY OF THE INVENTION

At least some of the above-mentioned problems may be solved by an apparatus or a method for determining a speed of a vehicle according to the descriptions herein and a vehicle according to the descriptions herein. The further descriptions herein relate to further specifically advantageous realizations of the main descriptions and embodiments herein.

The present invention relates to an apparatus for determining a speed of a vehicle. The vehicle comprises one or more sensors configured to determine a distance to or a relative speed of an object in an environment of the vehicle. The apparatus includes a data interface and a processing module. The data interface is configured to receive sensor data from the one or more sensors, wherein the sensor data indicate the distance to and/or the relative speed of the object. The processing module is configured to determine (i) a motion state of the object based on the received sensor data, and (ii) the speed of the vehicle based on the determined motion state and the received sensor data.

The "relative speed" refers to the speed of the vehicle relative to the object. The term "sensor" shall be construed broadly and include any unit which is able to obtain information about any state of the vehicle or the surrounding of the vehicle. The one or more sensors may be a sensor module or a network of distributed sensors of various kind. These sensors can thus be able to take sensor data to be available within a network on the vehicle for various control units. The one or more sensors or the sensor module are not necessarily implemented as an integrated units but may also be part of a sensor network. It is understood that the one or more sensors may or may not be part of the apparatus. To achieve the desired effect, it is merely needed that the apparatus is able to receive the sensor data.

Optionally, the processing module is configured to derive the speed of the object as the motion state. In particular, the processing module may be able to confirm or to determine that the object is static or non-moving (e.g. a building).

Embodiments of the present invention may use, in particular, sensors that are already present in the vehicle. For example, all kind of driver assistance systems typically include sensors which are capable of measuring a speed value of objects relative to the vehicle. Thus, the one or more sensors may comprise at least one of the following sensors: a radar, a LIDAR sensor, sensors of a collision mitigation system, sensors of a following distance control system (a system that controls the vehicle to follow another vehicle within a particular distance range), and sensors of a blind spot monitoring system. The processing module of the apparatus may thus be configured to determine a relative speed between the vehicle and the object based on the received sensor data.

In addition, the one or more sensors may comprise at least one of the following: a global positioning system, an information storage, a camera for capturing an image of the object. The data interface of the apparatus may thus be configured to receive further input data comprising at least one of the following: position data of the vehicle from the global positioning system, identification data of the object stored in the information storage, an image of the object captured by the camera or another sensor. Accordingly, the processing module may be configured to derive the motion state based on the further input data.

The information storage may store cartographic information about the environment of the vehicle. For example, map data can be stored in the information storage, wherein static objects are indicated as possible candidate objects along the path of the vehicle. This cartographic information can be used to identify detected objects in the surrounding of the vehicle. For example, a radar or a LIDAR can be employed to detect any object in the environment of the vehicle. Then, as a next step, the processing module may be configured to determine a distance to the object and to identify the object as one already indicated in the cartographic material. Hence, the cartographic information may indicate possible candidate objects at known positions which can be detected using the sensors in the vehicle. The cartographic material may include not only buildings, streets, bridges or other landmarks, but also trees, traffic signs, road markings, crash barriers, lane markings or other objects that may be usable for speed measurements within the present invention.

The data interface may optionally be configured to receive the cartographic data of the environment of the vehicle, and the processing module may be configured to derive the motion state and/or to identify the object based on the cartographic data, for example, based on the objects included in the cartographic data.

Optionally, the data interface may further be configured to receive an image of the object captured by one of the sensors, and the processing module may be configured to perform an image recognition on the capture image to determine a shape or form of the object depicted in the captured image and to identify, recognize or classify the object. The image may be captured not only by the camera, but also by other sensors (e.g. specific radar or LIDAR systems). Relevant objects may, in particular, be objects made of metal or comprise metal, such as bridges, buildings or traffic signs which reflect radar signal easily. However, the invention shall not be limited to these particular objects. Rather, also trees or even other vehicles can be used as objects with respect to which a relative speed can be determined by using the sensors in the vehicle.

The one or more sensors may further comprise at least one of the following motion sensors: a wheel speed sensor, an odometer sensor, a transmission axle speed sensor, an engine speed sensor. Accordingly, the processing unit may be configured to monitor the motion sensors to determine a speed of the vehicle. The monitoring may be performed constantly over at least some time period.

Optionally, the processing module is further configured to identify a series of objects subsequently passed by the vehicle when moving. The processing module may further be configured to determine subsequently (i) motion states of the series of objects based on the received sensor data, and (ii) the speed of the vehicle based on the determined motion states and the received sensor data to enable an ongoing determination of the speed of the vehicle.

Optionally, the processing module is further configured to judge whether the received sensor information is reliable based on a constant monitoring of the distance and/or the speed of the vehicle relative to one or more objects.

Optionally, the processing module is further configured to provide the determined speed of the vehicle to at least one of the following control units: a wheel slip control, an acceleration control, a deceleration control, a unit for checking a plausibility of the odometer speed and/or the positioning of the vehicle.

The present invention relates also to a vehicle (e.g. a commercial vehicle) with one of the previously defined apparatuses and at least one the following sensors: a radar, a LIDAR sensor, sensors of a collision mitigation system, sensors of a following distance control system and sensors of a blind spot monitoring system, a global positioning system, an information storage, a camera for capturing an image of the object, a wheel speed sensor, an odometer sensor, a transmission axle speed sensor, an engine speed sensor.

The present invention relates further to a method for determining a speed of a vehicle, wherein the vehicle comprises one or more sensors configured to determine a distance to or a relative speed of an object in an environment of the vehicle. The method comprises the steps of: receiving sensor data from the one or more sensors, wherein the sensor data indicate the distance to and/or the speed of the object; determining a motion state of the object based on the received sensor data; and determining the speed of the vehicle based on the determined motion state and the received sensor data.

This method may also be implemented in software or a computer program product. Thus, the present invention relates also to a computer program product having a program code stored thereon for performing the above-mentioned method, when the computer program is executed on a computer or processor. In addition, all functions described previously in conjunction with the apparatus can be realized as further method steps and be implemented in software or software modules.

In contrast to the known systems, based on GPS information and/or based on wheel speed information, embodiments provide the advantage of allowing a more precise determination of the speed of the vehicle. Moreover, embodiments allow to determine the vehicle speed even during severe environmental conditions (like rain or snow), where braking actions often results in uncertainties about the momentary vehicle speed (due to an increase in slip). Yet another advantage is that the additional sensors as known in the conventional speed detection systems are not needed.

Some examples of the system and/or methods will be described in the following by way of examples only, and with respect to the accompanying figures.

DETAILED DESCRIPTION

Figure 1:
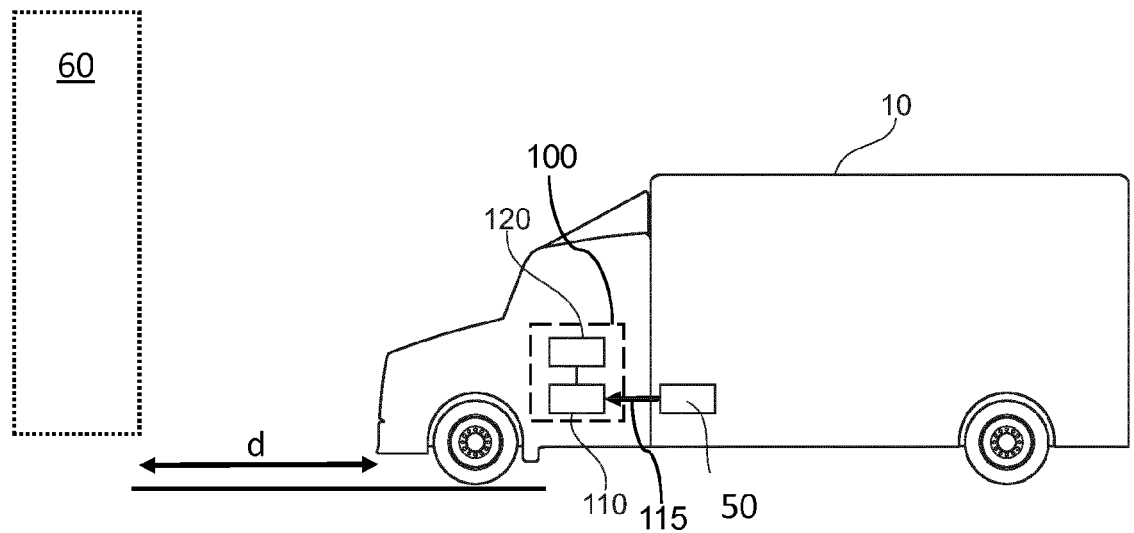
FIG. 1 shows a vehicle with an apparatus according to an embodiment of the present invention.

FIG. 1 shows an exemplary commercial vehicle 10 with one or more sensor(s) 50 and an apparatus 100. The apparatus 100 is suitable for determining a speed of the vehicle 10, and the one or more sensors 50 are configured to determine a distance "d" to or a relative speed of an object 60 in an environment of the vehicle 10. The apparatus 100 includes a data interface 110 configured to receive sensor data 115 from the one or more sensors 50. The sensor data 115 indicate the distance "d" to and/or the relative speed of the object 60. The apparatus 100 further includes a processing module 120 configured to determine:

(i) a motion state of the object 60 based on the received sensor data 115, and
(ii) the speed of the vehicle 10 based on the determined motion state and the received sensor data 115.

It is understood that neither the vehicle 10 nor the sensor(s) 50 are necessarily be part of the apparatus 100. However, according to further embodiments, the apparatus 100 itself may optionally include one or more own sensors. It is further understood that the apparatus 100 may be implemented in one of the control units present in the vehicle 10. The implementation that ensures the defined functions may rely on software installed on the control unit.

Therefore, the apparatus 100 may be part of an electronic control system of the vehicle 10 which comprises a sensor group (the one or more sensors 50) measuring the distance "d" and/or the speed of at least one object 60 in the environment of the vehicle 10 relatively to the motion of the vehicle 10. The speed of the vehicle 10 is determined as the speed of the vehicle 10 measured by the sensor group relative to the object 60, e.g. when it is classified as a non-moving object 60.

Figure 2:
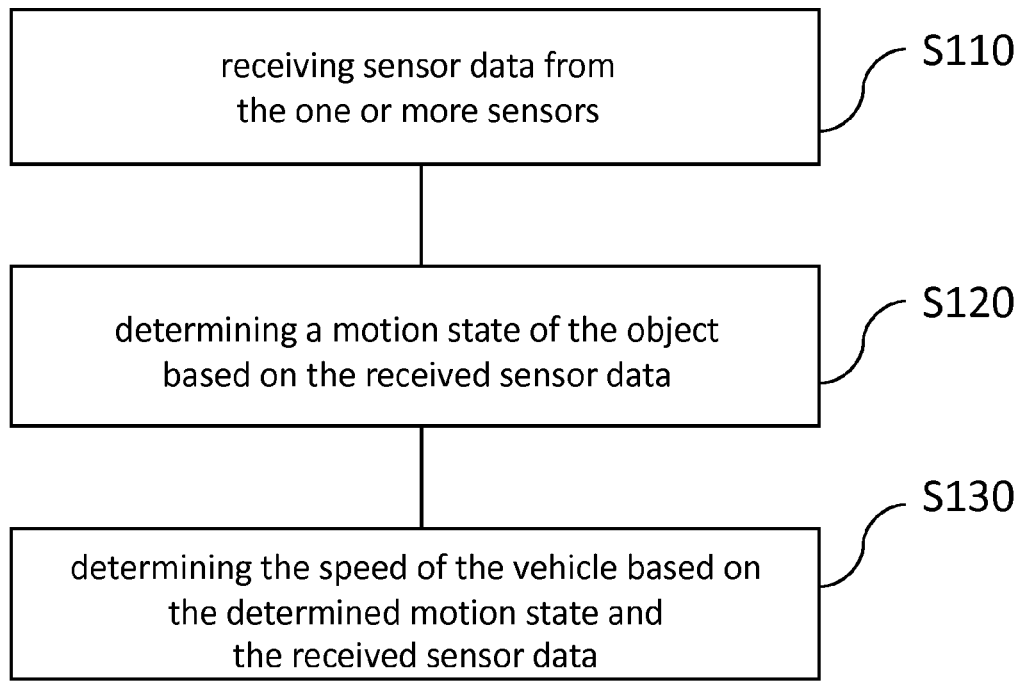
FIG. 2 shows a flow chart of a method for determining a speed of a vehicle according to embodiments of the present invention.

FIG. 2 shows a flow chart of a corresponding method for determining the speed of the vehicle 10. The method comprises receiving S110 sensor data 115 from the one or more sensors 50, wherein the sensor data 115 indicate the distance "d" to and/or the relative speed of the object 60. The method further comprises determining S120 a motion state of the object 60 based on the received sensor data 115, and determining S130 the speed of the vehicle 10 based on the determined motion state and the received sensor data 115.

It will be appreciated that all functions descripted in conjunction with the apparatus 100 may be implemented as further optional method steps.

The sensor group 50 may include a radar and/or a camera and/or a LIDAR sensor. These sensors may be part of a collision mitigation or following distance control or of a blind spot monitoring.

The motion state of the object 60 can be classified as non-moving or moving by continuous monitoring of the object 60 in comparison with the vehicle speed. The continuous monitoring uses, for example, at least one wheel speed sensor and/or an odometer sensor and/or a transmission axle speed sensor and/or an engine speed sensor and/or a GPS sensor to identify the motion state of the object 60. Optionally, these sensor data are merely used when the sensor information is reliable. The reliability test may rely on a cross-check of results from different types of sensors or by comparing results over a predetermined time period.

According to further embodiments, the determined vehicle speed may be used for at least one of the following controls: a wheel slip control, an acceleration control, a deceleration control, a plausibility check of the odometer speed, a positioning of the vehicle 10.

Embodiments provide the advantage that reliable sensors can be employed, which are already available on the vehicle 10 for different purposes. For example, a collision mitigation system, a forward distance control system and a blind spot monitoring system comprise sensors which are able to measure the position and the speed of the vehicle 10 relative to one or more objects 60 around the vehicle 10 precisely. At least some of these objects 60 are static whereas others are able to move, but momentarily do not move (like stopped vehicles), and yet other objects 60 are currently moving.

A reliable way to classify an object 60 as a non-moving object is the identification of the type of the object 60. For this, the motion state of the object 60 may be determined by measuring or detecting a shape or form of the object 60 so that the resulting data is suitable to recognize the object 60 as a standard static object (e.g. a bridge over the road). For example, environment detection sensors like cameras, laser scanners or some radar systems are able to determine the shape and the form of the object 60, thus allowing to classify the object 60 with respect to their natural behavior (whether they move or do not move or whether they can move or whether they are static).

According to embodiments, the detection and monitoring of these objects 60 can be performed continuously, wherein tracking data are derived for these objects 60. For example, once an object 60 is determined to be non-moving (e.g. a bridge or building), the apparatus is able to keep this information as long as the object 60 is visible in the detection range.

In case an object 60 cannot be determined by its shape or form (for example due to a low level of the available information), the measured relative speed of the object 60 to the vehicle 10 can still be sufficient to determine the motion state of the object 60. In this case, the conventional speed sources of the vehicle 10 can be used to verify whether the relative speed of the object 60 is equal to the vehicle speed or not, implying that the object 60 is a non-moving object. This conclusion is possible as long as the speed sources used for the determination of the relative velocity are reliable for this purpose. This implies that either the GPS satellite connection and the speed estimation is stable or the sensor information provided by the wheel speed sensors are captured in time when the wheel slip is close to zero. Once the apparatus confirms such a state, the motion state of the object 60 can be determined as non-moving and this information can be kept for the time, when the speed sources are no longer reliable. At that time, the relative speed of the object 60 and vehicle 10 will remain the more reliable vehicle speed determined before.

Figure 3:
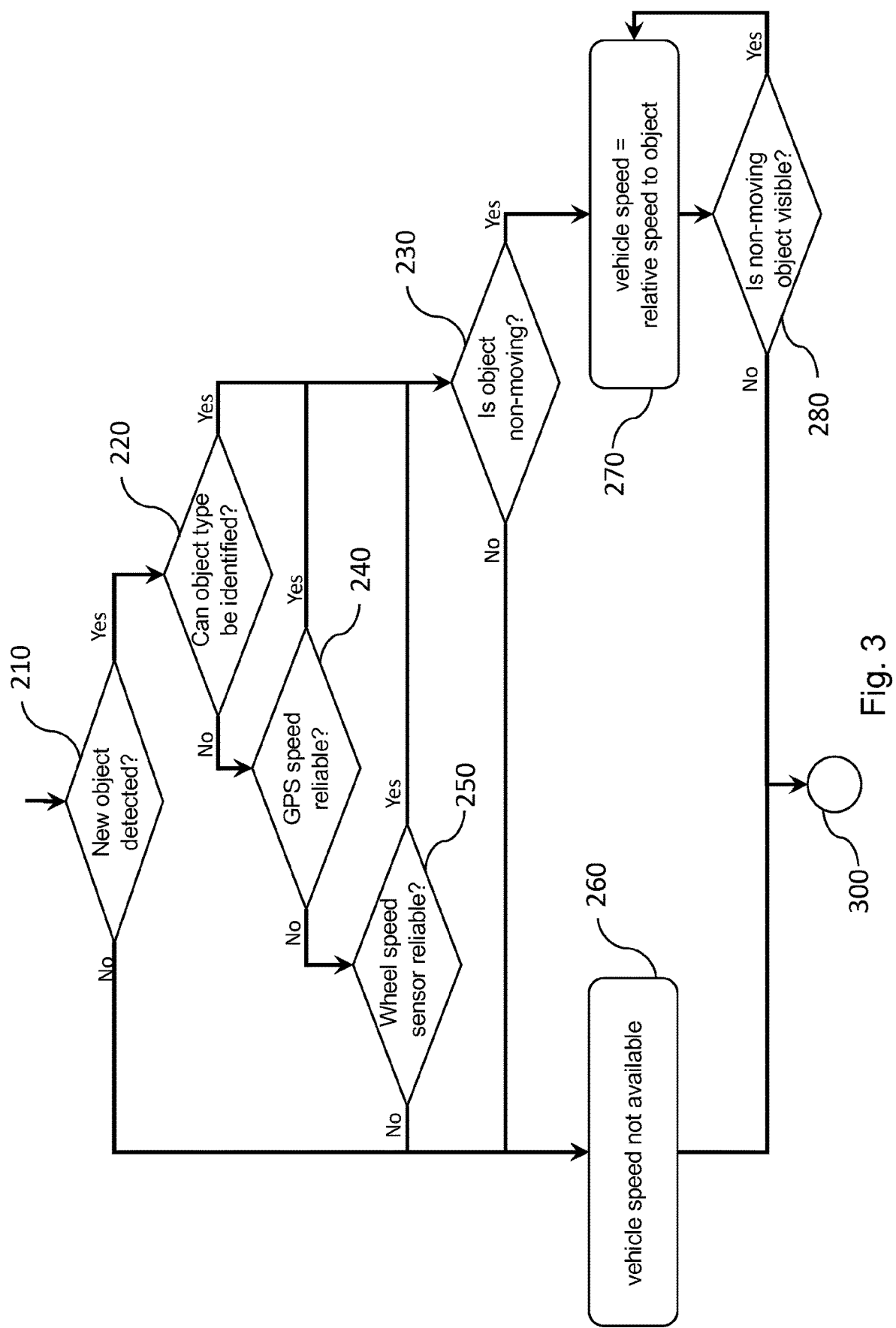
FIG. 3 shows further optional functions implemented in further embodiments of the present invention.

FIG. 3 illustrates the mentioned functions/acts in determining the vehicle speed in more detail. At a starting state, the apparatus 100 can monitor the environment of the vehicle 10 and scan for new objects 60 to be detected (see state 210). If a new object 60 is detected, the apparatus 100 addresses the question (state 220), whether the type of the object 60 can be identified. If this is possible, at state 230, the apparatus 100 asks, whether the object 60 is non-moving, in which case the vehicle speed is determined at state 270 as the relative speed to the object 60. This conclusion can be maintained for as long as the object 60 is visible. Therefore, as long as the apparatus 100 can confirm that the object 60 remains visible (state 280), the determined relative speed remains the vehicle speed.

If the object 60 at state 220 cannot be identified, the apparatus 100 asks at state 240, whether the GPS speed is reliable. If this is true, the apparatus 100 addresses at state 230 again the question, whether the object 60 is non-moving, in which case again the vehicle speed is determined to be the relative speed to the object 60 (state 270). If the GPS speed signal is determined not to be reliable (state 240), the apparatus determines at state 250, whether a speed sensor of a wheel connected to the axle is reliable, in which case the system continues with the determination, whether the object 60 is non-moving (at state 230). If this is confirmed, the vehicle speed is again determined as the relative speed to the object 60 at the state 270. In case no object is detected at the state 210 and/or the determination whether the wheel speed sensor is not reliable at state 250, it can be determined that the vehicle speed information is not available (state 260).

After this or if no other non-moving objects 60 are visible, the procedure can end at state 300.

In practice, embodiments may be used as follows. Before braking, at a slip value of nearly zero, the non-moving objects 60 are captured by comparing their relative speed to the wheel speeds. The relative speed may be measured by the environment detection sensors 50 and are used as vehicle speed afterwards, when, for example, a braking results in a slip value that is no longer zero resulting in an uncertainty about the actual vehicle speed.

It will be appreciated that any defined function may be provided through the use of dedicated hardware, such as a control unit being hardware capable of executing software in association with appropriate software. Therefore, the method according to the present invention may also be implemented in form of a computer program having a program code for performing the method, when the computer program is executed on a computer or processor.

Moreover, any entity described herein as "a module", may correspond to or be implemented as "one or more modules", "one or more devices", "one or more units", etc.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The list of reference signs is as follows:
10 vehicle
50 sensor(s)
60 object
100 apparatus
110 data interface
115 receive sensor data
120 processing module
d distance between vehicle and object

The invention claimed is:

1. An apparatus for determining a speed of a vehicle having at least one sensor to determine a distance to or a relative speed of an object in an environment of the vehicle, comprising:
a data interface to receive sensor data from the at least one sensor, the sensor data indicating the distance to and/or the relative speed of the object, wherein the at least one sensor includes a camera for capturing an image of the object, and wherein the data interface is further configured to receive the image of the object captured by the camera; and
a processing module to determine (i) a motion state of the object based on the received sensor data, and (ii) the speed of the vehicle based on the determined motion state and the received sensor data, and wherein the processing module is further configured to further determine the motion state of the object by performing an image recognition on the capture image to determine a shape or form of the object depicted in the captured image and to identify or classify the object to be a standard static object;
wherein detection and monitoring of the object is performed continuously, and tracking data are derived for the object, and wherein when the object is determined to be non-moving, this information kept as long as the object is visible in a detection range, and
wherein when the object cannot be determined by the shape or form, the measured relative speed of the object to the vehicle is used to determine the motion state of the object, in which case, speed sources of the vehicle are used to verify whether the relative speed of the object is equal to the vehicle speed, which implies that the object is a non-moving object, so long as either a GPS satellite connection and a speed estimation is stable or the sensor information provided by the wheel speed sensors are captured in time when the wheel slip is close to zero, and wherein when such a state is confirmed, the motion state of the object can be determined as non-moving and this information is kept for when the speed sources are not reliable, and wherein at which time, the relative speed of the object and vehicle will be the vehicle speed determined before.

2. The apparatus of claim 1, wherein the processing module is configured to derive as the motion state the speed of the object, including a confirmation whether the object is non-moving.

3. The apparatus of claim 1, wherein the at least one sensor includes at least one of the following sensors: a radar, a LIDAR sensor, a sensor of a collision mitigation system, a sensor of a following distance control system, and a sensor of a blind spot monitoring system, and wherein the processing module is configured to determine the relative speed between the vehicle and the object based on the received sensor data.

4. The apparatus of claim 3, wherein the data interface is configured to receive an image of the object captured by one of the sensors, and wherein the processing module is configured to perform an image recognition on the capture image to determine a shape or form of the object depicted in the captured image and to identify or classify the object based on the cartographic data.

5. The apparatus of claim 4, wherein the data interface is configured to receive cartographic data of the environment of the vehicle; and wherein the processing module is configured to derive the motion state and/or to identify the object based on the cartographic data.

6. The apparatus of claim 1, wherein the at least one sensor includes at least one of a global positioning system, an information storage, and a camera for capturing an image of the object, wherein the data interface is configured to receive further input data including at least one of the following: position data of the vehicle from the global positioning system, identification data of the object stored in the information storage, an image of the object captured by the camera, and wherein the processing module is configured to derive the motion state based on the further input data.

7. The apparatus of claim 6, wherein the processing module is configured to identify a series of objects subsequently passed by the vehicle when moving, and to determine subsequently (i) motion states of the series of objects based on the received sensor data, and (ii) the speed of the vehicle based on the determined motion states and the received sensor data to enable an ongoing determination of the speed of the vehicle.

8. The apparatus of claim 1, wherein the at least one sensor includes at least one of the following motion sensors: a wheel speed sensor, an odometer sensor, a transmission axle speed sensor, an engine speed sensor, and wherein the processing unit is configured to monitor the motion sensors to determine a speed of the vehicle.

9. The apparatus of claim 8, wherein the processing module is configured to judge whether the received sensor information is reliable based on a constant monitoring of the distance and/or the speed of the vehicle relative to one or more objects and/or a detected slip value of one of the sensors.

10. The apparatus of claim 9, wherein the processing module is configured to use, if currently received sensor information are judged unreliable, a previously determined reliable sensor information.

11. The apparatus of claim 1, wherein the processing module is configured to provide the determined speed of the vehicle to at least one of the following control units: a wheel slip control, an acceleration control, a deceleration control, a unit for checking a plausibility of the odometer speed and/or the positioning of the vehicle.

12. The apparatus of claim 1, wherein the processing module is configured to derive as the motion state the speed of the object, including a confirmation that the object is non-moving.

13. A vehicle, comprising:
an apparatus for determining a speed of a vehicle having at least one sensor to determine a distance to or a relative speed of an object in an environment of the vehicle, including:

a data interface to receive sensor data from the at least one sensor, the sensor data indicating the distance to and/or the relative speed of the object, wherein the at least one sensor includes a camera for capturing an image of the object, and wherein the data interface is further configured to receive the image of the object captured by the camera; and a processing module to determine (i) a motion state of the object based on the received sensor data, and (ii) the speed of the vehicle based on the determined motion state and the received sensor data, and wherein the processing module is further configured to further determine the motion state of the object by performing an image recognition on the capture image to determine a shape or form of the object depicted in the captured image and to identify or classify the object to be a standard static object; and at least one of the following sensors: a radar, a LIDAR sensor, sensors of a collision mitigation system, sensors of a following distance control system, sensors of a blind spot monitoring system, a global positioning system, a camera for capturing an image of the object, a wheel speed sensor, an odometer sensor, a transmission axle speed sensor, an engine speed sensor;

wherein detection and monitoring of the object is performed continuously, and tracking data are derived for the object, and wherein when the object is determined to be non-moving, this information kept as long as the object is visible in a detection range, and wherein when the object cannot be determined by the shape or form, the measured relative speed of the object to the vehicle is used to determine the motion state of the object, in which case, speed sources of the vehicle are used to verify whether the relative speed of the object is equal to the vehicle speed, which implies that the object is a non-moving object, so long as either a GPS satellite connection and a speed estimation is stable or the sensor information provided by the wheel speed sensors are captured in time when the wheel slip is close to zero, and wherein when such a state is confirmed, the motion state of the object can be determined as non-moving and this information is kept for when the speed sources are not reliable, and wherein at which time, the relative speed of the object and vehicle will be the vehicle speed determined before.

14. The vehicle of claim 13, wherein the vehicle is a commercial vehicle.

15. A method for determining a speed of a vehicle having at least one sensor to determine a distance to or a relative speed of an object in an environment of the vehicle, the method comprising:

receiving sensor data from the at least one sensor, the sensor data indicating the distance to and/or the relative speed of the object, wherein the at least one sensor includes a camera for capturing an image of the object, and wherein the data interface is further configured to receive the image of the object captured by the camera;

determining a motion state of the object based on the received sensor data;

determining the speed of the vehicle based on the determined motion state and the received sensor data, and wherein the motion state of the object is determined by performing an image recognition on the capture image to determine a shape or form of the object depicted in the captured image and to identify or classify the object to be a standard static object;

wherein detection and monitoring of the object is performed continuously, and tracking data are derived for the object, and wherein when the object is determined to be non-moving, this information kept as long as the object is visible in a detection range, and wherein when the object cannot be determined by the shape or form, the measured relative speed of the object to the vehicle is used to determine the motion state of the object, in which case, speed sources of the vehicle are used to verify whether the relative speed of the object is equal to the vehicle speed, which implies that the object is a non-moving object, so long as either a GPS satellite connection and a speed estimation is stable or the sensor information provided by the wheel speed sensors are captured in time when the wheel slip is close to zero, and wherein when such a state is confirmed, the motion state of the object can be determined as non-moving and this information is kept for when the speed sources are not reliable, and wherein at which time, the relative speed of the object and vehicle will be the vehicle speed determined before.

16. A non-transitory computer readable medium having a computer program, which is executable by a processor, comprising:

a program code arrangement having program code for determining a speed of a vehicle having at least one sensor to determine a distance to or a relative speed of an object in an environment of the vehicle, by performing the following:

receiving sensor data from the at least one sensor, the sensor data indicating the distance to and/or the relative speed of the object, wherein the at least one sensor includes a camera for capturing an image of the object, and wherein the data interface is further configured to receive the image of the object captured by the camera;

determining a motion state of the object based on the received sensor data; and determining the speed of the vehicle based on the determined motion state and the received sensor data, and wherein the motion state of the object is determined by performing an image recognition on the capture image to determine a shape or form of the object depicted in the captured image and to identify or classify the object to be a standard static object;

wherein detection and monitoring of the object is performed continuously, and tracking data are derived for the object, and wherein when the object is determined to be non-moving, this information kept as long as the object is visible in a detection range, and wherein when the object cannot be determined by the shape or form, the measured relative speed of the object to the vehicle is used to determine the motion state of the object, in which case, speed sources of the vehicle are used to verify whether the relative speed of the object is equal to the vehicle speed, which implies that the object is a non-moving object, so long as either a GPS satellite connection and a speed estimation is stable or the sensor information provided by the wheel speed sensors are captured in time when the wheel slip is close to zero, and wherein when such a state is confirmed, the motion state of the object can be determined as non-moving and this information is kept for when the speed sources are not reliable, and wherein at which time, the relative speed of the object and vehicle will be the vehicle speed determined before.

\* \* \* \* \*